UNITED STATES PATENT OFFICE.

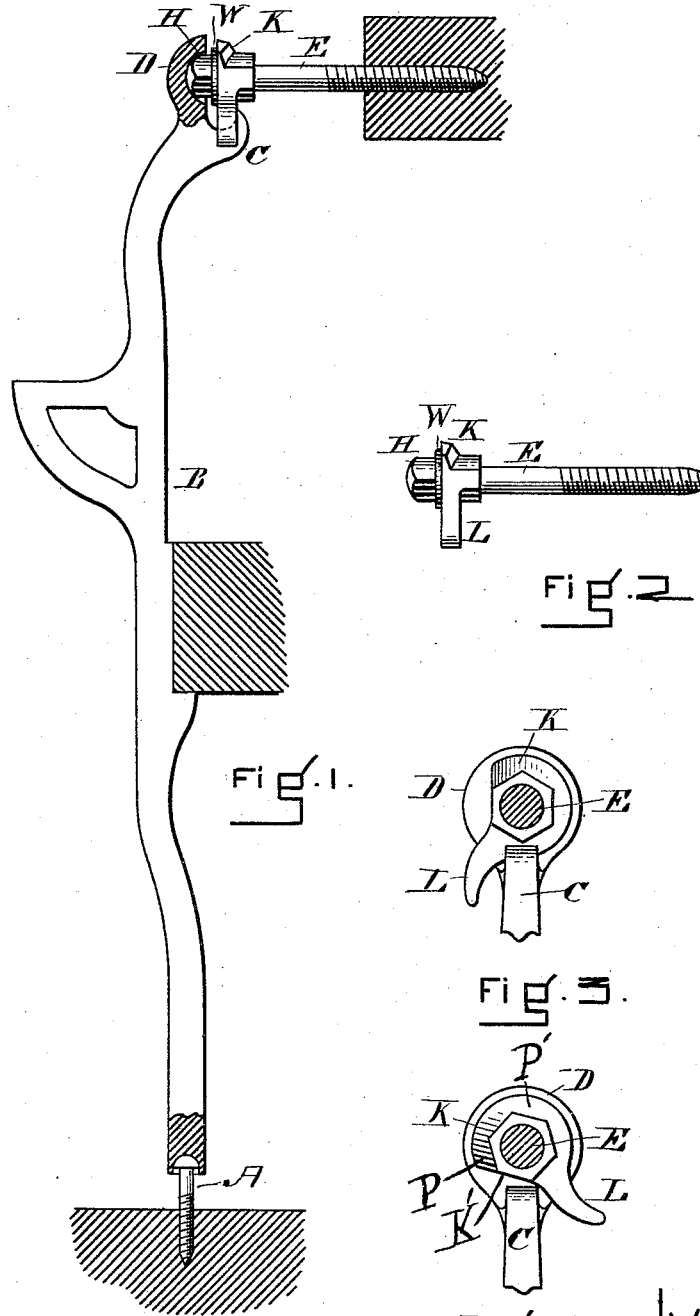

PETER KRUMSCHEID, OF BOSTON, MASSACHUSETTS.

PIANO-FORTE.

SPECIFICATION forming part of Letters Patent No. 443,578, dated December 30, 1890.

Application filed May 7, 1890. Serial No. 350,872. (No model.)

*To all whom it may concern:*

Be it known that I, PETER KRUMSCHEID, of Boston, in the county of Suffolk and State of Massachusetts, have invented a new and useful Improvement in Piano-Fortes, of which the following, taken in connection with the accompanying drawings, is a specification.

The object of my invention is to so construct the upper end connection of a pianoforte bracket that the bracket is easily attached and detached, firmly held, and perfectly adjustable. This object I attain by the mechanism shown in the accompanying drawings, in which—

Figure 1 shows in elevation a piano-forte bracket in connection with my device. Fig. 2 shows the upper connecting-bolt and the locking device. Figs. 3 and 4 illustrate the working of the locking device, the views being from the interior looking outward, the parts being represented in full size.

In the drawings, B represents a piano-forte bracket, which may be in any desired style. The lower end of this bracket is recessed and is supported on a pin A or in any of the ordinary ways.

The novelty of my device is in connection of fastening or locking the upper end, the said upper end having a part D, the inner face of which is hollowed out hemispherically and adapted to fit the rounded head H of the bolt E. The upper end of the bracket has a hook C, which is intended to engage with a snail-cam K, the construction and action of which I will now describe.

The snail-cam K is formed substantially as shown in the drawings and is adapted to turn on the bolt E near the head of the same; but between the under side of the head H of the bolt and the cam K, I have a small elastic washer, so that the cam will exert a yielding pressure on the hook C, so that the upper terminations D and C form a kind of fork, the two parts of which embrace the head H of the bolt, and also a part of the cam K, and are thus held very firmly in the desired position. The snail-cam K extends from the point P to P' on an incline—that is, it constitutes an arc-shaped wedge, which as the cam is turned firmly locks the forked part D C of the bracket to the head H of the bolt E.

For convenience in adjusting the bolt E, the head is made polygonal for receiving a wrench, so that the bolt may be readily turned—that is, screwed in or out, as may be required to get the proper adjustment.

The cam K is cut away at K', so that when the cam is turned by the lever L into the position shown in Fig. 4 then it is entirely disengaged from the arm C and the bracket B is released. It is obvious that when the cam K is turned, as shown in Fig. 3, it engages with the arm C, and thus holds the bracket firmly in place.

I do not confine myself to the form and arrangement of the parts of this device, as they may be varied and yet embody my invention.

I claim—

1. The combination of the bracket B, having a forked head D D, with the bolt E, provided with a head H, and the cam K, substantially as and for the purpose set forth.

2. The combination of the bracket B, having a forked head D C, with the headed bolt E, elastic washer W, and cam K, substantially as and for the purpose set forth.

3. The combination of the bracket B and arm C with the cam K and bolt E, substantially as and for the purpose set forth.

PETER KRUMSCHEID.

Witnesses:
WILLIAM EDSON,
ALONZO F. ANDREWS.